June 20, 1939.   E. S. PORTER   2,163,179
FILM MAGAZINE
Original Filed July 7, 1934
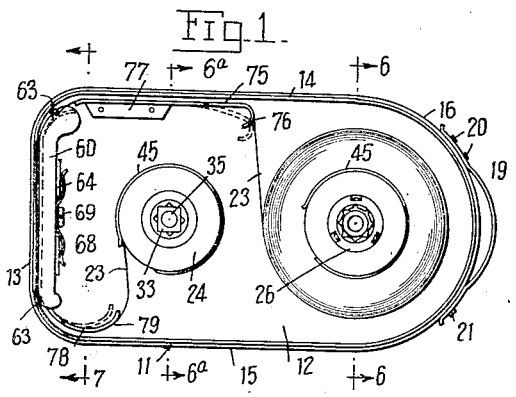
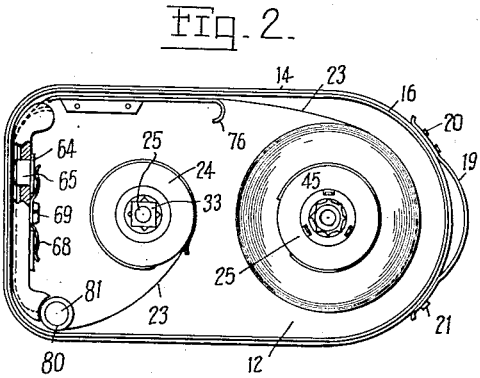
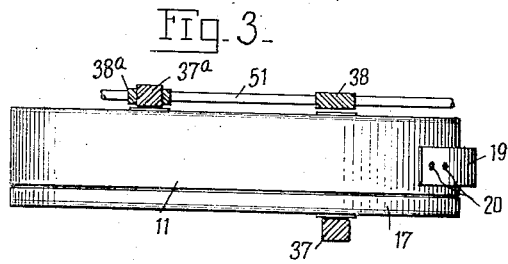
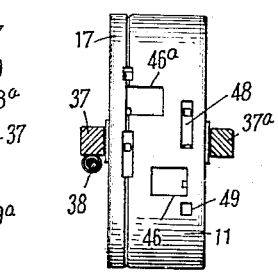
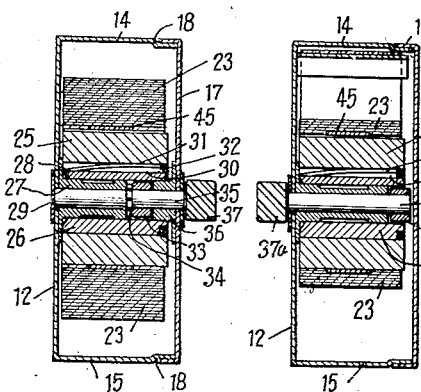
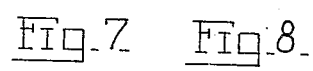
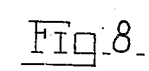
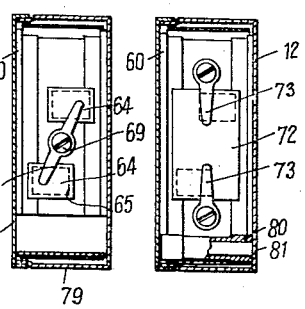
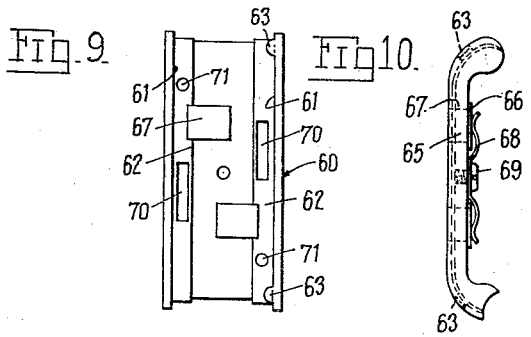
INVENTOR
*Edwin Stanton Porter*
BY
*Austin & Dix*
ATTORNEYS Patented June 20, 1939

2,163,179

UNITED STATES PATENT OFFICE 2,163,179

FILM MAGAZINE

Edwin Stanton Porter, New York, N. Y.

Application July 7, 1934, Serial No. 734,137
Renewed March 18, 1937

4 Claims. (Cl. 88—16)

This invention relates to magazines for receiving motion picture film, which magazines are adapted to be loaded with film at the factory, to be inserted as a unit into a special camera and exposed by it, and to be withdrawn as a unit from the camera for developing, all without the need for any threading of the film or any particular mechanical skill on the part of the amateur or other person using the camera.

A feature of the present invention resides in the provision of an improved film magazine which enables the film to be exposed by running it once in one direction and once in the other direction, so that two series of pictures can be photographed on the same film, one series on each side of the center line of the film, the film subsequently being split down the center and the two sections being spliced end to end after removal from the magazine.

Another feature resides in the provision of a film magazine which is adapted to guide the film in accurate relation to an aperture through which light strikes the film, when the film is fed in either direction.

A more specific feature lies in the provision of a magazine having a pair of spaced openings or windows adapted to be aligned with the lens of a camera and constructed so that the magazine may be placed in the camera for exposure of one half of the film and may thereafter be removed, reversed and replaced in the camera for exposure of the other half of the film.

Still another feature of the invention resides in improved mechanism for winding the film in conjunction with the feeding of successive portions into position for exposure, and more particularly in such mechanism which is adapted to wind the film first in one direction and then in the other.

A further feature resides in the provision of a magazine of the character indicated which is adapted to cooperate with a camera having an intermittent claw for advancing the film and a pilot pin for holding stationary successive portions of the film during exposure, when the claw is not advancing the film.

A specific feature resides in providing a magazine which enables the film to be wound in either direction with its emulsion side in, i. e., facing the center of the spools on which the film is preferably wound.

A more general feature of the invention resides in providing an improved film magazine which is simple and inexpensive to manufacture, easy to use, and durable and efficient in operation.

Other and more detailed features, objects and advantages will become apparent as the following detailed description of certain illustrative embodiments of my invention proceeds, reference being had to the accompanying drawing, wherein:

Fig. 1 is a side elevation of one form of magazine in accordance with the invention, the cover of the magazine having been removed;

Fig. 2 is a similar view of a modified form of magazine, also in accordance with the invention;

Fig. 3 is a top plan view of the magazine shown in Figs. 1 and 2 with their covers in place, a camera drive shaft being also shown;

Fig. 4 is a front elevation of the construction shown in Fig. 3;

Fig. 5 is a view similar to Fig. 4, but with the magazine reversed;

Figs. 6 and 6a are vertical sections taken on the lines 6—6 and 6a—6a of Fig. 1, respectively, looking in the direction of the arrows;

Fig. 7 is a vertical section taken on the line 7—7 of Fig. 1, looking in the direction of the arrows;

Fig. 8 is a view similar to Fig. 7, but showing a modified construction;

Fig. 9 is a front elevation of one form of film guiding construction within the magazine, the walls of the magazine being omitted; and Fig. 10 is a side elevation of the construction shown in Fig. 9.

Referring now to the drawing, in more detail, the construction illustrated includes a casing 11 made of any suitable material and having a side wall 12, front wall 13, top and bottom walls 14 and 15, and rear wall 16. A cover 17 may be removably engaged with the casing by means of a snug fit with shouldered portions 18 of the casing (Fig. 6), so that the casing is light-tight. In order to facilitate the removal of the magazine from the camera, a curved handle 19, formed of flat spring steel, may be secured to the wall 16 of the casing, for instance by rivets 20. The other end of handle 20 may be provided with a slot (not shown), which rides the shank of a pin 21 secured to the casing. In this manner the spring is permitted to flex and may cooperate with the door of the magazine housing of a camera so that when the door is closed against the spring, the magazine is urged against the front of the camera housing, thus insuring proper positioning of the magazine in the camera. While a handle of this type is highly advantageous, it is not an essential part of the present invention.

The casing 11 is of suitable depth or thickness to accommodate a film 23 of desired or standard width, for instance 16 m. m., and may be constructed so as to aid in preventing any excessive, lateral unevenness in the winding of the film upon spools 24 and 25. Spool 24 may serve as the take-up spool and spool 25 as the take-off spool, during the initial running of the film, (although the reverse order may be used if desired). A feature of the present construction is that each spool is capable of functioning in turn as a take-off spool and a take-up spool, and the two spools may advantageously be constructed similarly. Accordingly, a description of the construction of one spool will serve to indicate certain desirable features of both.

As best illustrated in Figs. 1 and 6, the spool 25 is journalled on a sleeve 26 which in turn is journalled on a stub shaft 27 secured to the rear wall of the casing, for instance through a flange 28 welded or otherwise attached to wall 12. In order to simplify manufacturing operations, the shaft 27 may be formed hollow so as to be a duplicate of the shaft used for carrying the spool 24, as hereinafter described. Where an opening is punched or otherwise formed in the casing for aligning the stub shaft or for facilitating manufacturing operations, this opening should be closed, for example by plate 29, to prevent light from penetrating the casing at this point.

Between the spool 25 and the sleeve 26 there is provided means for enabling slippage between the spool and the sleeve during operation of the spool as a film take-up device. In cameras of the type mentioned above it is advantageous to wind the film continuously while intermittent mechanism alternately advances successive film sections into alignment with the camera lens and stops the section momentarily for exposure. In order to prevent slack and at the same time avoid breaking the film under excessive tension, it is preferable to allow for slippage between the spool and the sleeve. For this purpose there may be employed a construction of the type illustrated in Patent No. 2,022,353 to Albert Kindelmann and Julius Pearlman. For instance, any suitable number of slots 30 (three being shown) may be formed in the sleeve 26, extending parallel to its axis. Within each slot there may be disposed a leaf sprng 31, secured at one end to the sleeve and bearng at other points against the opposite wall of the spool. A flange 32 may be carried by one end of the sleeve and the springs 31 may be attached to this flange in any suitable manner. The force with which the springs act to cause the spool and sleeve to rotate together should preferably be great enough to insure the winding of the film under normal operating conditions but small enough to allow slippage to take place should the film become jammed or permanently stopped at any other point in the magazine.

For turning the sleeve 26 and spool 25, there is provided a toothed member 33 adapted to engage axial slots 34 formed in the interior of the sleeve 26, the member 33 being attached to a shaft 35 journalled in a bushing 36 secured to the housing cover 17. The shaft 35 extends through the cover and is provided with a gear 37 for meshing with a worm 38 or other suitable driving means in the camera.

As shown in Fig. 6a, the construction of the spool 24, as well as of the sleeve, slippage device, and stub shaft for the spool, may be substantially identical with the corresponding parts described, but the shaft 35 in this case is reversed and journalled in the hollow stub shaft 27 with the gear 37a rearward of the wall 12 of the casing, or in other words on the opposite side of the casing from the gear 37 as shown in Fig. 6. If a plate 29 is here employed it is suitably apertured. If desired, the cover 17, opposite the axis of spool 24, may be provided with a solid bearing member (not shown) similar to member 36, adapted to serve as a bearing for the end of this sleeve, although such member is ordinarily not required. On the other hand, if desired, the stub shaft 27 and shaft 35 for spool 24 may be lengthened to the full width of the spool 24, to provide an extended bearing for this spool. The spool 24 and its sleeve may preferably be constructed so that they may be removed by slipping them toward the open side of the casing, over the member 33.

Any suitable devices may be employed for attaching the ends of the film to the spools. For instance, split spring clips 45, under which the ends of the film are placed, are satisfactory for this purpose. However, the film may be attached to the spools in any other convenient manner.

Adjacent the front wall of the magazine there are provided spaced windows 46 and 46a, through which light strikes the film for exposing respective series of views on opposite sides of the center line of the film. The window 46a in Fig. 4 is in line with the optical system or lens of a camera while the film is fed from take-off spool 25 to take-up spool 24. This feeding of the film may advantageously be accomplished by the combined action of a claw and pilot pin mechanism which cooperates with the sprocket holes 50 of the film through openings 48a and 49a, respectively, in the front wall 13 of the magazine, in conjunction with the continuous reeling of the take-up spool 24, which is driven through camera shaft 51, worm 38a, and gear 37a. The claw and pilot pin mechanism is not described here in detail, save to say that the pilot pin acts through opening 49a to hold the film against movement, by engagement with the sprocket holes 50, between the times when the film is being pulled down by the claw acting through opening 48a. However, while the present magazine is especially adapted for use with a camera having a claw and pin mechanism, its use is not restricted thereto.

Preferably, the windows 46 and 46a are spaced vertically in the magazine, as well as being offset laterally, for in this manner each series of pictures may be taken without danger that the light will reach the other half of the film and spoil the latter. The windows 46 and 46a may have substantially the same size as the desired size of pictures in order to serve as apertures for controlling the light admitted to the film, or they may be somewhat larger, as shown, for cooperation with a suitably mounted aperture plate. The manner of constructing and mounting the aperture plate is not a feature of the present invention, at least in its broader aspects.

Preferably, though not necessarily, the claw slots 48 and 48a are located above and to the outside of the respective windows, while the openings 49 and 49a for the pilot pins are below the windows, when in operating position, one set of window, slot, and opening being symmetrically arranged with respect to the other set.

It will be understod from the foregoing that when one half of the film has been exposed, in the construction illustrated, by running the film from spool 25 to spool 24, with the magazine in the position shown in Fig. 4, it is merely necessary to withdraw the magazine from the camera, turn it 180° about its center line, and reinsert it in the camera in its position shown in Fig. 5. The gear 37 will then engage the worm 38, and the film may be run from spool 24 to spool 25, the window 46 being then aligned with the camera lens and aperture plate.

Through the present construction it is possible to drive the shaft 51 always in the same direction, as is highly desirable in order to avoid complicating the camera mechanism, which should be as simple and compact as possible, particularly in small size cameras intended primarily for use by amateurs. Also, the worms 38 and 38a may be made alike, as may the gears 37 and 37a, which results in simplifying manufacturing operations. Moreover, only a single drive shaft is required.

With reference now to means for guiding the film in line with the windows 46 and 46a and for maintaining it taut during the reeling in either direction for exposure of the film, it may be mentioned that the invention in its broader aspects is not limited to the details of such means, although good results may be achieved with a construction of the following character.

As best shown in Figs. 1, 7 and 9, a gate plate 60 is provided adjacent the front wall 13 of the casing. This plate may be rigidly secured to the side wall 12 of the casing in any convenient manner, for instance by means of screws (not shown) extending into the rear face of the plate so as not to interfere with the travel of the film or with other parts hereafter described. The gate plate is preferably provided on its front face with a channel formed between shoulders 61 which serve to edge guide the film, while the margins of the film ride on surfaces 62. Suitable ears 63 may be provided for preventing the film from bulging away from surfaces 62 near the upper and lower ends of the gate plate. The gate may be formed of any suitable material such as steel or Bakelite and is preferably rigid and accurately formed so that the film will lie flat immediately rearward of the windows 46 and 46a. Preferably, the gate is arranged so that the front or emulsion side of the film does not bind against the front wall of the casing, although it lies close thereto.

In order to aid in maintaining the film flat in back of the windows which admit light to it, and also to prevent such light from reaching portions of the film other than that actually being exposed, presser feet 64 may be employed for urging the film toward the windows 46 and 46a. These presser feet may be of any convenient construction. For instance, they may include box-shaped portions 65 having rear flanges 66, the portions 65 being slidably mounted in openings 67 extending through the gate plate and the flanges being adapted to limit forward movement of the presser feet by reason of abutment with the rear face of the gate plate. The forward faces of the portions 65 are preferably flat but their centers may be slightly depressed, if desired, so that the presser feet only contact the margins of the film section being exposed. A spring member 68, secured to the gate plate as by bolt 69, constantly urges the presser feet forwardly. If desired, as shown in Fig. 8, both presser feet may be carried by a single member 72 which is yieldingly urged forward by one or more suitable springs 73. Suitable depressions or slots 70 and 71 may be formed in the gate plate to permit claw and pin mechanism to cooperate with the sprocket holes in the film.

It will be appreciated that the film has a tendency to bulge outwardly or forwardly, away from the gate plate, and in order to avoid this, during the time the film is being run through the camera, the aperture plate (not shown) may aid in flattening the film at proper focal distance from the camera lens. On the other hand, the bulge of the film may not be disadvantageous, for it aids in making the magazine light-tight when it is removed from the camera. However, no claim is made herein to this feature per se.

As best illustrated in Figs. 1 and 7, means are preferably provided for holding the film taut and at the same time for yielding to enable the film to be wound continuously on the take-up spool during the times when the film section being exposed is held stationary by the pin or other intermittent mechanism. For this purpose, a flat spring 75, having a curved end 76 may be riveted or otherwise secured to the casing through a flange 77, the film sliding over this spring to spool 25. Similarly, a spring member 78 having a curved end 79 may be secured to the gate plate 60, or to the casing if desired, the film sliding along this spring and then passing to spool 24.

The spring members 75 and 78 are each of such length, curvature and flexibility that the film coming from the gate may be wound on either spool, acting as a take-up spool, without the film taking such sharp angles as would tend to crimp or break the film, while the flexing of the springs, as indicated in dotted lines in Fig. 1, permits continuous winding on either spool in spite of the film in the gate being momentarily stopped during the periods of exposure. That is to say, the spring between the gate and the take-up spool yields amply to allow the spool to continue winding the film at all times. Moreover, the film may be reeled onto either spool in the construction described without any need for adjustment of the springs 75 and 78, one of which remains idle while the other functions as described.

However, if desired, the slippage devices associated with the spools may be so designed that one or both of the springs 75 and 78 may be dispensed with, the tape-up spool slipping when the film in the gate is stopped. For instance, as shown in Figs. 2 and 8, a roller 80 may be provided, journalled on any convenient pin 81 secured to the casing, the roller serving to guide the film and permit it to pass to or from the spool in a smooth curve.

It will be noted that in the construction of Fig. 1 the film is wound with its emulsion side in, or facing the axes of the spools, and this construction is preferable. However, as shown in Fig. 2, the film may be wound with its emulsion side out. Since the spools in Fig. 2 rotate in the opposite directions to those shown in Fig. 1, for reeling in a given direction, either the direction of rotation of the shaft 51, or the cut of the teeth on gears 37 and 37a and worms 38 and 38a, must be reversed for use with the latter type of winding.

In loading the magazine at the factory it is merely necessary to take the spool 25 with film wound on it and slip the spool, assembled with the sleeve 26, onto the stub shaft 27. The free end of the film can then be threaded over the spring 75, through the gate and under the spring 78, after which it can be attached to spool 24, the sleeve of which is slipped onto its stub shaft with the grooves 34 in engagement with the teeth on member 33 for driving this spool. The cover is then placed on the magazine so that the grooves in the sleeve of sprocket 25 are engaged with the cooperating member 33 for driving this spool. The front wall 13 of the magazine may then be sealed against the ingress of light by any suitable device or wrapping which can be removed just before the magazine is placed in the camera.

It will be appreciated that there is thus provided a simple and effective film magazine which can be handled and used by an amateur without any special precautions, and which enables the film to be run through the magazine twice, once in one direction and once in the other, without opening the magazine. More particularly, the magazine can be used with cameras of a type already on the market, by merely extending the drive shaft of the camera and adding another driving element to the shaft, which can always run in the same direction. A minimum number of different parts are required and the magazine can be easily manufactured and readily loaded.

Furthermore, the magazine can be easily reversed and the possibility of placing it in the camera twice the same way is reduced to a minimum, and even if this should be done the slippage features prevent any damage to the film or mechanism upon starting up the camera after the film has been fully wound in a given direction. In addition many of the parts, such as the spools and sleeves, are interchangeable with corresponding parts, and the assembly of magazine is handily accomplished. The construction is extremely compact and there are a minimum number of parts protruding from the casing.

By employing spaced windows of the character described, especially in conjunction with certain of other features indicated, the register of the pictures on the film is accurate and there is no waste of film between the views at either side of the center line. Moreover, while two windows are provided, only one aperture plate and lens system is required in the camera.

While certain novel features of the invention have been disclosed and are pointed out in the annexed claims, it will be understood that various omissions, substitutions and changes may be made by those skilled in the art without departing from the spirit of the invention.

For instance, if it be desired to employ the magazine for 8 m. m. film, this may be done by merely inserting in the magazine a suitable device for edge-guiding the film, and by running the film in a single direction past one of the windows, all without radical changes in the structure of the magazine, which is thus interchangeably usable with different widths of film.

What is claimed is:

1. In a device of the character described, a shaft adapted to be rotated always in the same direction, a film magazine comprising a plurality of spools, a driven element on one side of the magazine for driving one of said spools, a driven element on the other side of said magazine for driving the other of said spools, and driving elements carried on said shaft and spaced along the length thereof for respectively engaging each of said driven elements, whereby said magazine may be reversed for enabling the film to be wound first in one direction and then in the other.

2. In a construction of the character described, in combination, a shaft having a plurality of gears mounted thereon, a casing adapted to be supported in juxtaposition to the shaft, a plurality of film winding spools received in said casing, a gear extending beyond one side of said casing and connected with one of said spools, and a gear extending beyond the other side of said casing and connected with the other spool, whereby the said casing is reversible for engagement of respective pairs of gears on casing and shaft, for driving one of said spools in one direction and the other of said spools in the opposite direction.

3. In a motion picture camera and magazine construction of the character described, a shaft carried by the camera and having a plurality of driving elements mounted thereon at spaced points, a casing adapted to be supported in juxtaposition to the shaft, said casing having a pair of spaced windows in one end thereof for respectively exposing portions of the film on opposite sides of the center line thereof, a plurality of film winding spools received in said casing, a driven member connected to one of said spools and lying at one side of the casing for engagement with one of said driving elements, and a driven element lying at the opposite side of said casing and connected with the other spool for engaging the other of said driving elements, whereby said casing is reversible for engagement between respective pairs of said driving elements and driven members by turning the casing 180 degrees about its optical axis.

4. In a film magazine for motion picture cameras, a casing with a cover constituting the magazine, a pair of spools mounted in said casing and having parts extending through said magazine to be driven by suitable mechanism in the camera into which the magazine is placed for picture taking, one wall of said casing being provided with two exposure openings for picture taking, one opening in one part of said wall to be operative when half of the width of the film in said casing is being exposed and the other opening in another part of said wall being operative after the magazine has been turned 180 degrees about the axis perpendicular to the wall with said exposure openings therein and the other half of said film being exposed in front of the last exposure opening, a single gate plate with two openings therein being mounted in said casing for guiding the film in front of said exposure openings in the wall of the casing, a film engaging member loosely positioned in each of the openings in said gate plate for pressing the film against the wall of the casing with the exposure openings therein, means associated with said gate plate for resiliently urging said film engaging members against the film, means on said magazine parts extending through the magazine for driving said spools alternately to positively wind up the film after it has passed one of said exposure openings, and slippage means operatively interposed between each of said spools and each of said driving means.

EDWIN STANTON PORTER.